US012756415B2

(12) United States Patent
Chang et al.

(10) Patent No.: US 12,756,415 B2
(45) Date of Patent: Oct. 6, 2026

(54) MOBILE DEVICE FOR REDUCING SPECIFIC ABSORPTION RATE

(71) Applicant: Acer Incorporated, New Taipei City (TW)

(72) Inventors: Kun-Sheng Chang, New Taipei City (TW); Ching-Chi Lin, New Taipei City (TW)

(73) Assignee: ACER INCORPORATED, New Taipei City (TW)

(*) Notice: Subject to any disclaimer, the term of this patent is extended or adjusted under 35 U.S.C. 154(b) by 268 days.

(21) Appl. No.: 18/767,220

(22) Filed: Jul. 9, 2024

(65) Prior Publication Data

US 2025/0357959 A1 Nov. 20, 2025

(30) Foreign Application Priority Data

May 20, 2024 (TW) ................................ 113118506

(51) Int. Cl.
*H04B 1/3827* (2015.01)

(52) U.S. Cl.
CPC ................................ *H04B 1/3838* (2013.01)

(58) Field of Classification Search
CPC ................. H04B 1/3838; H01Q 13/18; H01Q 5/357–371; H01Q 5/378–392; H01Q 5/307–392
See application file for complete search history.

(56) References Cited

U.S. PATENT DOCUMENTS 5,467,095 A * 11/1995 Rodal .................. H01Q 9/0407 343/846
6,686,886 B2 * 2/2004 Flint ........................ H01Q 9/42 343/702

(Continued)

FOREIGN PATENT DOCUMENTS

| | | | |
|---|---|---|---|
| CN | 102751570 | A | 10/2012 |
| CN | 116247420 | A | 6/2023 |
| WO | 2020135177 | A1 | 7/2020 |

OTHER PUBLICATIONS

Chinese language office action dated Feb. 27, 2025, issued in application No. TW 113118506.

*Primary Examiner* — Jinsong Hu
*Assistant Examiner* — Rui M Hu
(74) *Attorney, Agent, or Firm* — McClure, Qualey & Rodack, LLP

(57) ABSTRACT

A mobile device for reducing SAR (Specific Absorption Rate) includes a grounding radiation element, a feeding radiation element, a main radiation element, a first side radiation element, a second side radiation element, and a dielectric substrate. The main radiation element is coupled to the feeding radiation element. The first side radiation element is coupled to the feeding radiation element. The main radiation element is coupled through the first side radiation element to a first grounding point on the grounding radiation element. The main radiation element is also coupled through the second side radiation element to a second grounding point on the grounding radiation element. An antenna structure is formed by the grounding radiation element, the feeding radiation element, the main radiation element, the first side radiation element, and the second side radiation element. The main radiation element and the feeding radiation element have a plurality of edge notches.

12 Claims, 3 Drawing Sheets

100

(56) References Cited

U.S. PATENT DOCUMENTS 9,608,331 B1 * 3/2017 Rowson ................... H01Q 9/16
9,722,304 B2 * 8/2017 Yang ...................... H01Q 1/243
11,670,853 B2 * 6/2023 Wang ..................... H01Q 1/243
343/848
12,567,675 B2 * 3/2026 Hong ..................... H01Q 13/18
2004/0085245 A1 * 5/2004 Miyata ................... H01Q 5/371
343/702
2006/0255950 A1 * 11/2006 Roeder ................ G06K 7/0008
340/572.7
2007/0001911 A1 * 1/2007 Fujio ........................ H01Q 9/42
343/700 MS
2007/0001913 A1 * 1/2007 Tsai ....................... H01Q 5/371
343/702
2010/0220023 A1 * 9/2010 Ge ......................... H01Q 19/26
343/700 MS
2011/0080333 A1 * 4/2011 Wu ........................ H01Q 5/371
343/906
2011/0309992 A1 * 12/2011 Ali ........................... H01Q 5/00
343/848
2012/0050111 A1 * 3/2012 Tai ........................... H01Q 9/42
343/700 MS
2013/0321231 A1 * 12/2013 Flores-Cuadras ...... H01Q 9/285
343/793
2014/0028530 A1 * 1/2014 Flores-Cuadras ........ H01Q 9/42
343/904
2015/0123874 A1 * 5/2015 Chan ........................ H01Q 5/30
343/905
2015/0381229 A1 * 12/2015 Tzanidis .............. H01Q 9/0457
455/73
2020/0083599 A1 * 3/2020 Huang ................... H01Q 1/243
2021/0044000 A1 * 2/2021 Chang ...................... H01Q 1/38
2021/0167501 A1 * 6/2021 Lo .......................... H01Q 1/243
2021/0296787 A1 * 9/2021 Kolitsidas ............ H01Q 13/085
2021/0328349 A1 * 10/2021 Jian ........................ H01Q 13/10
2021/0328352 A1 * 10/2021 Huang ..................... H01Q 9/42
2021/0367327 A1 * 11/2021 Chang .................. H01Q 1/2266
2022/0109250 A1 * 4/2022 Tsai ....................... H01Q 1/243
2023/0155296 A1 * 5/2023 Wu ........................ H01Q 1/521
343/702
2023/0261378 A1 * 8/2023 Huang ................. H01Q 1/2283
343/824
2024/0072445 A1 * 2/2024 Tai ......................... H01Q 5/371
2024/0113424 A1 * 4/2024 Wei ...................... H01Q 1/2266
2024/0186708 A1 * 6/2024 Guo ....................... H01Q 9/065
2024/0213681 A1 * 6/2024 Chang .................... H01Q 1/245
2024/0291150 A1 * 8/2024 Lee ...................... H01Q 1/2266
2025/0023244 A1 * 1/2025 Peng .................... H01Q 9/0421
2025/0046996 A1 * 2/2025 Su ............................ H01Q 5/50
2025/0096476 A1 * 3/2025 Wu ........................ H01Q 1/243
2025/0112363 A1 * 4/2025 Lin ........................ H01Q 5/371
2025/0174900 A1 * 5/2025 Zhao ........................ H01Q 7/00
2025/0266619 A1 * 8/2025 Shih ......................... H01Q 1/48
2025/0286277 A1 * 9/2025 Tai ......................... H01Q 5/328
2026/0058370 A1 * 2/2026 Zhang .................... H01Q 5/385

* cited by examiner

MOBILE DEVICE FOR REDUCING SPECIFIC ABSORPTION RATE

CROSS REFERENCE TO RELATED APPLICATIONS

This application claims priority of Taiwan Patent Application No. 113118506 filed on May 20, 2024, the entirety of which is incorporated by reference herein.

BACKGROUND OF THE INVENTION

Field of the Invention

The disclosure generally relates to a mobile device, and more particularly, it relates to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna is an indispensable component in mobile devices that support wireless communication. However, the antenna can easily be affected by adjacent metal components, which can often interfere with the antenna and degrade the overall communication quality. Alternatively, the SAR (Specific Absorption Rate) may be too high to comply with regulations and laws. Accordingly, there is a need to propose a novel solution for solving the problems of the prior art.

BRIEF SUMMARY OF THE INVENTION

In an exemplary embodiment, the disclosure is directed to a mobile device for reducing SAR (Specific Absorption Rate). The mobile device includes a grounding radiation element, a feeding radiation element, a main radiation element, a first side radiation element, a second side radiation element, and a dielectric substrate. The grounding radiation element is coupled to a ground voltage. The feeding radiation element has a feeding point. The main radiation element is coupled to the feeding radiation element. The first side radiation element is coupled to the feeding radiation element. The main radiation element is coupled through the first side radiation element to a first grounding point on the grounding radiation element. The main radiation element is also coupled through the second side radiation element to a second grounding point on the grounding radiation element. The grounding radiation element, the feeding radiation element, the main radiation element, the first side radiation element, and the second side radiation element are all disposed on the dielectric substrate. An antenna structure is formed by the grounding radiation element, the feeding radiation element, the main radiation element, the first side radiation element, and the second side radiation element. The main radiation element and the feeding radiation element have a plurality of edge notches.

In some embodiments, a closed slot region is surrounded by the grounding radiation element, the feeding radiation element, the main radiation element, the first side radiation element, and the second side radiation element.

In some embodiments, the closed slot region substantially has a variable-width U-shape.

In some embodiments, the closed slot region includes a first branch portion, a second branch portion, and a widening portion. The first branch portion is positioned between the feeding radiation element and the main radiation element. The second branch portion is positioned between the feeding radiation element and the grounding radiation element.

In some embodiments, the main radiation element has 5 edge notches, and the feeding radiation element has 2 edge notches. Each of the edge notches substantially has a rectangular shape.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the main radiation element is substantially equal to 0.5 wavelength of the first frequency band.

In some embodiments, the total length of the first side radiation element, the main radiation element, and the second side radiation element is substantially equal to 1 wavelength of the second frequency band.

In some embodiments, an additional resonant path is formed from the feeding point through the feeding radiation element and the first side radiation element to the first grounding point. The length of the additional resonant path is substantially equal to 0.5 wavelength of the third frequency band.

In some embodiments, the length of the first branch portion of the closed slot region is substantially equal to 0.25 wavelength of the third frequency band. The length of the second branch portion of the closed slot region is substantially equal to 0.5 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
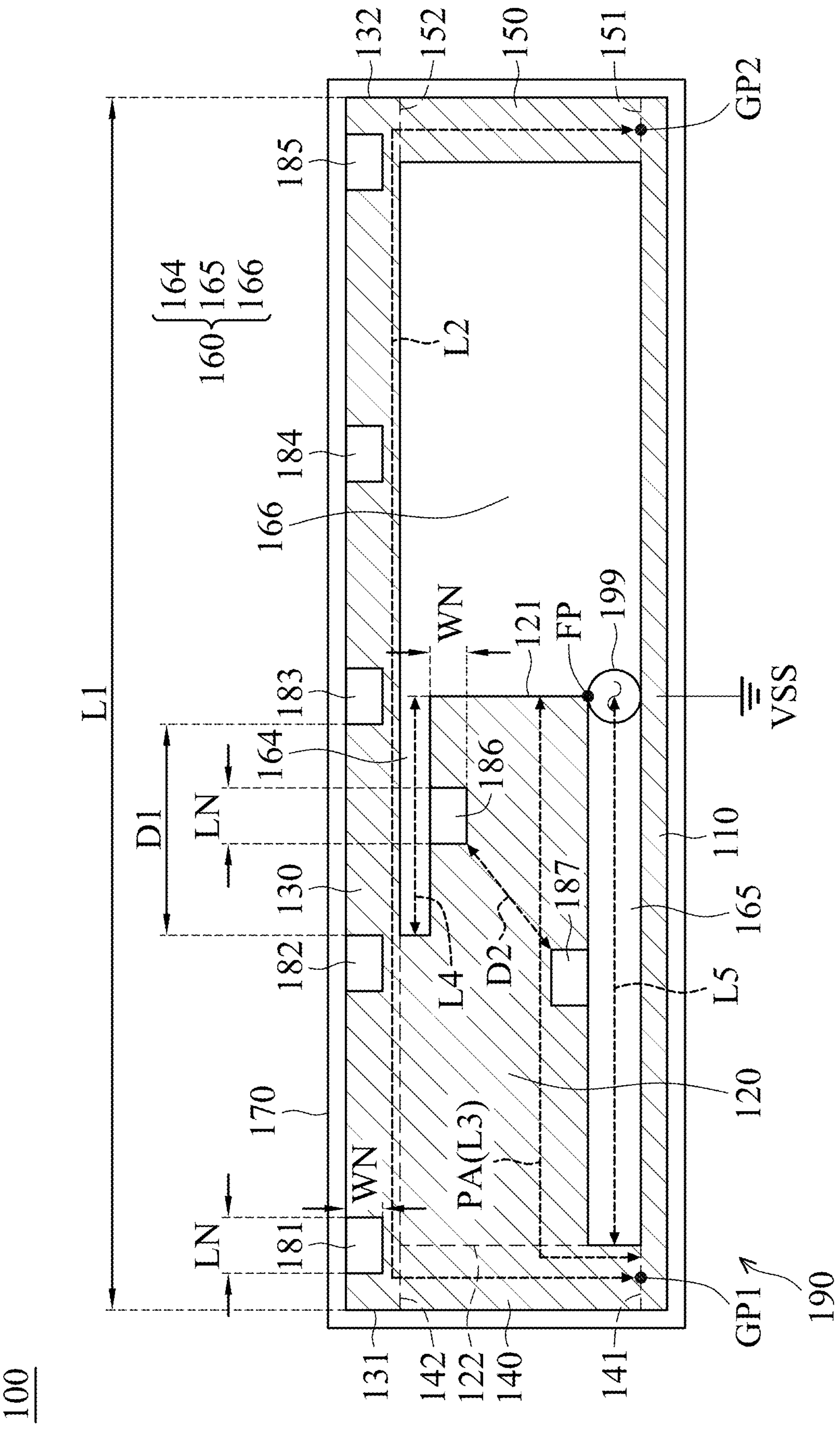
FIG. 1 is a top view of a mobile device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smart phone, a tablet computer, or a notebook computer. In the embodiment of FIG. 1, the mobile device 100 includes a grounding radiation element 110, a feeding radiation element 120, a main radiation element 130, a first side radiation element 140, a second side radiation element 150, and a dielectric substrate 170. The grounding radiation element 110, the feeding radiation element 120, the main radiation element 130, the first side radiation element 140, and the second side radiation element 150 may all be made of metal materials, such as copper, silver, aluminum, iron, or their alloys. It should be understood that the mobile device 100 may further include other components, such as a processor, a touch control panel, a speaker, a battery module, and a housing, although they are not displayed in FIG. 1.

The grounding radiation element 110 is coupled to a ground voltage VSS. For example, the ground voltage VSS may be provided by a system ground plane (not shown) of the mobile device 100, but it is not limited thereto.

The feeding radiation element 120 may substantially have a variable-width straight-line shape, which may be adjacent to the grounding radiation element 110. Specifically, the feeding radiation element 120 has a first end 121 and a second end 122. A feeding point FP is positioned at the first end 121 of the feeding radiation element 120. The feeding point FP may be further coupled to a positive electrode of a signal source 199. A negative electrode of the signal source 199 may be coupled to the grounding radiation element 110. For example, the signal source 199 may be an RF (Radio Frequency) module. It should be noted that the term "adjacent" or "close" over the disclosure means that the spacing of the two corresponding elements (i.e., the distance between them) is smaller than a predetermined distance (e.g., 10 mm or shorter), but often this does not mean that the two corresponding elements directly touch each other (i.e., the aforementioned distance, or space, between them is reduced to 0).

The main radiation element 130 may substantially have another variable-width straight-line shape, which may be substantially opposite and parallel to the grounding radiation element 110. Specifically, the main radiation element 130 has a first end 131 and a second end 132. The first end 131 of the main radiation element 130 is coupled through the first side radiation element 140 to the second end 122 of the feeding radiation element 120.

The first side radiation element 140 may substantially have an equal-width straight-line shape. Specifically, the first side radiation element 140 has a first end 141 and a second end 142. The first end 141 of the first side radiation element 140 is coupled to a first grounding point GP1 on the grounding radiation element 110. The second end 142 of the first side radiation element 140 is coupled to the first end 131 of the main radiation element 130. That is, the main radiation element 130 is coupled through the first side radiation element 140 to the first grounding point GP1.

The second side radiation element 150 may substantially have another equal-width straight-line shape, which may be substantially opposite and parallel to the first side radiation element 140. Specifically, the second side radiation element 150 has a first end 151 and a second end 152. The first end 151 of the second side radiation element 150 is coupled to a second grounding point GP2 on the grounding radiation element 110. The second end 152 of the second side radiation element 150 is coupled to the second end 132 of the main radiation element 130. The second grounding point GP2 may be different from the aforementioned first grounding point GP1. In other words, the main radiation element 130 is further coupled through the second side radiation element 150 to the second grounding point GP2.

In some embodiments, a closed slot region 160 is surrounded by the grounding radiation element 110, the feeding radiation element 120, the main radiation element 130, the first side radiation element 140, and the second side radiation element 150. For example, the closed slot region 160 may substantially have a variable-width U-shape. Specifically, the closed slot region 160 includes a first branch portion 164, a second branch portion 165, and a widening portion 166. The first branch portion 164 is positioned between the feeding radiation element 120 and the main radiation element 130. The second branch portion 165 is positioned between the feeding radiation element 120 and the grounding radiation element 110.

The dielectric substrate 170 may be an FR4 (Flame Retardant 4) substrate, a PCB (Printed Circuit Board), or an FPC (Flexible Printed Circuit), but it is not limited thereto. In some embodiments, the grounding radiation element 110, the feeding radiation element 120, the main radiation element 130, the first side radiation element 140, and the second side radiation element 150 are all disposed on the same surface of the dielectric substrate 170.

In a preferred embodiment, an antenna structure 190 of the mobile device 100 is formed by the grounding radiation element 110, the feeding radiation element 120, the main radiation element 130, the first side radiation element 140, and the second side radiation element 150. In some embodiments, the antenna structure 190 is a planar antenna structure. However, the invention is not limited thereto. In alternative embodiments, the antenna structure 190 is modified to a 3D (Three Dimensional) antenna structure.

It should be noted that in order to reduce the SAR (Specific Absorption Rate) of the antenna structure 190 of the mobile device 100, the main radiation element 130 and the feeding radiation element 120 have a plurality of edge notches. For example, the main radiation element 130 may have 5 edge notches 181, 182, 183, 184 and 185, and the feeding radiation element 120 may have 2 edge notches 186 and 187. Each of the edge notches 181, 182, 183, 184, 185, 186 and 187 may substantially have a rectangular shape. In alternative embodiments, the number and the positions of edge notches 181, 182, 183, 184, 185, 186 and 187 are adjustable according to different requirements.

Figure 2:
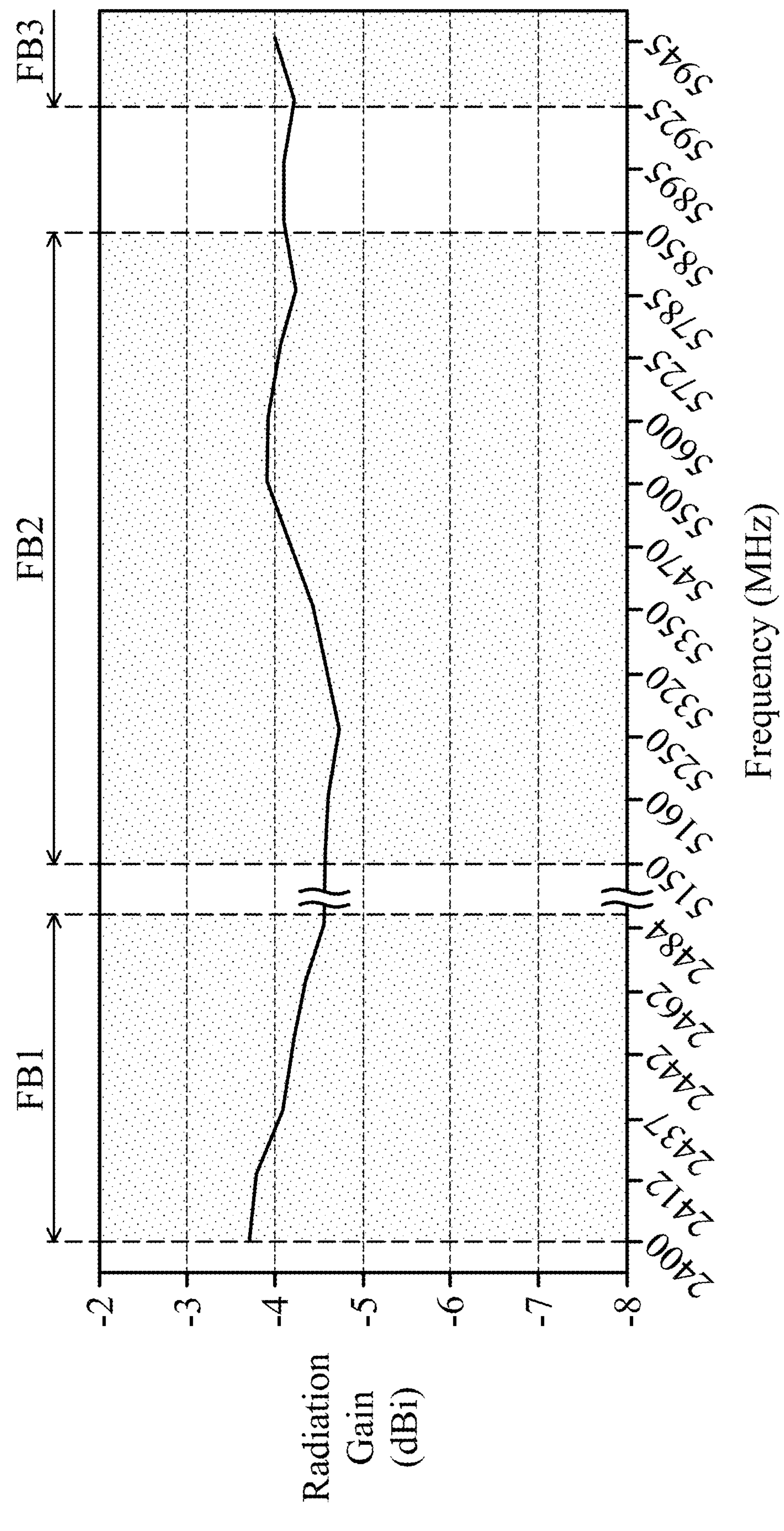
FIG. 2 is a diagram of radiation gain of an antenna structure of a mobile device according to an embodiment of the invention.

FIG. 2 is a diagram of radiation gain of the antenna structure 190 of the mobile device 100 according to an embodiment of the invention. The horizontal axis represents the operational frequency (MHz), and the vertical axis represents the radiation gain (dBi). According to the measurement of FIG. 2, the antenna structure 190 of the mobile device 100 can cover a first frequency band FB1, a second frequency band FB2, and a third frequency band FB3. For example, the first frequency band FB1 may be from 2400 MHz to 2500 MHZ, the second frequency band FB2 may be from 5150 MHz to 5850 MHz, and the third frequency band FB3 may be from 5925 MHz to 7125 MHz, but they are not limited thereto. As a result, the antenna structure 190 of the mobile device 100 can support at least the wideband operations of WLAN (Wireless Local Area Networks), Wi-Fi 6E, and Wi-Fi 7. In addition, the radiation gain of the antenna structure 190 of the mobile device 100 can reach −5 dBi or the higher within the first frequency band FB1, the second frequency band FB2, and the third frequency band FB3 as mentioned above. It can meet the requirements of practical applications of general mobile communication devices.

In some embodiments, the operational principles of the antenna structure 190 of the mobile device 100 will be described as follows. The main radiation element 130 can be excited to generate the first frequency band FB1. There is an additional resonant path PA formed from the feeding point FP through the feeding radiation element 120 and the first side radiation element 140 to the first grounding point GP1. The additional resonant path PA can contribute to the first frequency band FB1. The first side radiation element 140, the main radiation element 130, and the second side radiation element 150 can be excited to generate the second frequency band FB2. Furthermore, the additional resonant path PA can be excited to generate the third frequency band FB3. According to practical measurements, the SAR of the antenna structure 190 of the mobile device 100 can be significantly reduced by at least 50% within the second frequency band FB2 and the third frequency band FB3 since the existences of the edge notches 181, 182, 183, 184, 185, 186 and 187 change the current distribution on the feeding radiation element 120 and the main radiation element 130 and also decrease the current density thereof.

In some embodiments, the element sizes of the mobile device 100 will be described as follows. The length L1 of the main radiation element 130 may be substantially equal to 0.5 wavelength (λ/2) of the first frequency band FB1 of the antenna structure 190 of the mobile device 100. The total length L2 of the first side radiation element 140, the main radiation element 130, and the second side radiation element 150 may be substantially equal to 1 wavelength (1λ) of the second frequency band FB2 of the antenna structure 190 of the mobile device 100. The length L3 of the additional resonant path PA may be substantially equal to 0.5 wavelength (λ/2) of the third frequency band FB3 of the antenna structure 190 of the mobile device 100. Among the closed slot region 160, the length L4 of the first branch portion 164 may be substantially equal to 0.25 wavelength (λ/4) of the third frequency band FB3 of the antenna structure 190 of the mobile device 100, and the length L5 of the second branch portion 165 may be substantially equal to 0.5 wavelength (λ/2) of the third frequency band FB3 of the antenna structure 190 of the mobile device 100. The length LN of each of the edge notches 181, 182, 183, 184, 185, 186 and 187 may be from 1.8 mm to 2.2 mm, such as about 2 mm. The width WN of each of the edge notches 181, 182, 183, 184, 185, 186 and 187 may be from 0.9 mm to 1.1 mm, such as about 1 mm. Furthermore, the distance D1 between any adjacent two of the edge notches 181, 182, 183, 184 and 185 may be substantially equal to 0.25 wavelength (λ/4) of the third frequency band FB3 of the antenna structure 190 of the mobile device 100. The distance D2 between the edge notches 186 and 187 may also be substantially equal to 0.25 wavelength (λ/4) of the third frequency band FB3 of the antenna structure 190 of the mobile device 100. The above ranges of element sizes are calculated and obtained according to the results of many experiments, and they help to optimize the SAR, the operational bandwidth, and the impedance matching of the antenna structure 190 of the mobile device 100.

Figure 3:
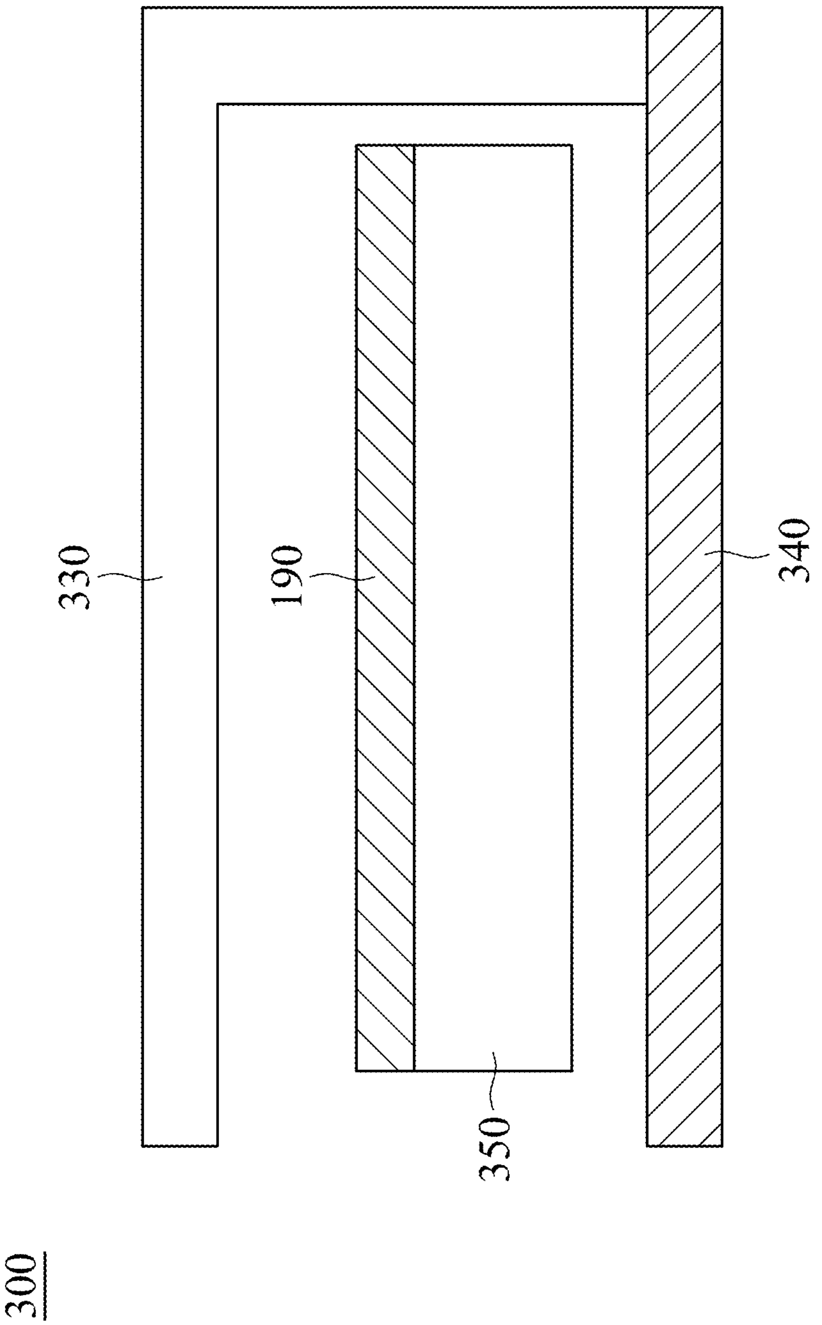
FIG. 3 is a sectional view of a mobile device according to an embodiment of the invention.

FIG. 3 is a sectional view of a mobile device 300 according to an embodiment of the invention. In the embodiment of FIG. 3, the mobile device 300 is a notebook computer and includes a keyboard frame 330 and a base housing 340. It should be understood that the keyboard frame 330 and the base housing 340 are equivalent to the so-called "C-component" and "D-component" in the field of notebook computers, respectively. The keyboard frame 330 may be made of a nonconductive material. The base housing 340 may be made of a metal material. The antenna structure 190 as mentioned in the embodiments of FIG. 1 and FIG. 2 may be disposed between the keyboard frame 330 and the base housing 340. In addition, the mobile device 300 may further include a speaker element 350, and the antenna structure 190 may be disposed on the speaker element 350. According to practical measurements, such an integrated design can help to minimize the overall size of the mobile device 300. Other features of the mobile device 300 of FIG. 3 are similar to those of the mobile device 100 of FIG. 1. Accordingly, the two embodiments can achieve similar levels of performance.

The invention proposes a novel mobile device and its antenna structure. Compared to the conventional design, the invention has at least the advantages of low SAR, small size, wide bandwidth and low manufacturing cost, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device and antenna structure of the invention are not limited to the configurations of FIGS. 1-3. The invention may merely include any one or more features of any one or more embodiments of FIGS. 1-3. In other words, not all of the features displayed in the figures should be implemented in the mobile device and antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device for reducing SAR (Specific Absorption Rate), comprising:

a grounding radiation element, coupled to a ground voltage;

a feeding radiation element, having a feeding point;

a main radiation element, coupled to the feeding radiation element;

a first side radiation element, coupled to the feeding radiation element, wherein the main radiation element is coupled through the first side radiation element to a first grounding point on the grounding radiation element;

a second side radiation element, wherein the main radiation element is further coupled through the second side radiation element to a second grounding point on the grounding radiation element; and a dielectric substrate, wherein the grounding radiation element, the feeding radiation element, the main radiation element, the first side radiation element, and the second side radiation element are disposed on the dielectric substrate;

wherein an antenna structure is formed by the grounding radiation element, the feeding radiation element, the main radiation element, the first side radiation element, and the second side radiation element;

wherein the main radiation element and the feeding radiation element have a plurality of edge notches;

wherein a closed slot region is surrounded by the grounding radiation element, the feeding radiation element, the main radiation element, the first side radiation element, and the second side radiation element;

wherein the closed slot region comprises a first branch portion, a second branch portion, and a widening portion;

wherein the first branch portion of the closed slot region is positioned between the feeding radiation element and the main radiation element.

2. The mobile device as claimed in claim 1, wherein the closed slot region substantially has a variable-width U-shape.

3. The mobile device as claimed in claim 1, wherein the second branch portion of the closed slot region is positioned between the feeding radiation element and the grounding radiation element.

4. The mobile device as claimed in claim 1, wherein the main radiation element has 5 edge notches, and the feeding radiation element has 2 edge notches.

5. The mobile device as claimed in claim 1, wherein each of the edge notches substantially has a rectangular shape.

6. The mobile device as claimed in claim 1, wherein the antenna structure covers a first frequency band, a second frequency band, and a third frequency band.

7. The mobile device as claimed in claim 6, wherein the first frequency band is from 2400 MHz to 2500 MHz, the second frequency band is from 5150 MHz to 5850 MHz, and the third frequency band is from 5925 MHz to 7125 MHz.

8. The mobile device as claimed in claim 6, wherein a length of the main radiation element is substantially equal to 0.5 wavelength of the first frequency band.

9. The mobile device as claimed in claim 6, wherein a total length of the first side radiation element, the main radiation element, and the second side radiation element is substantially equal to 1 wavelength of the second frequency band.

10. The mobile device as claimed in claim 6, wherein an additional resonant path is formed from the feeding point through the feeding radiation element and the first side radiation element to the first grounding point, and a length of the additional resonant path is substantially equal to 0.5 wavelength of the third frequency band.

11. The mobile device as claimed in claim 6, wherein a length of the first branch portion of the closed slot region is substantially equal to 0.25 wavelength of the third frequency band.

12. The mobile device as claimed in claim 6, wherein a length of the second branch portion of the closed slot region is substantially equal to 0.5 wavelength of the third frequency band.

* * * * *